United States Patent [19]

Saito et al.

[11] E Patent Number: Re. 32,839

[45] Reissued Date of Patent: Jan. 24, 1989

[54] BALUSTRADE OF PASSENGER CONVEYOR

[75] Inventors: Cyuichi Saito; Yoshihiko Sato, both of Katsuta, Japan

[73] Assignee: Hitachi, Ltd., Tokyo, Japan

[21] Appl. No.: 135,442

[22] Filed: Dec. 21, 1987

Related U.S. Patent Documents

Reissue of:

[64] Patent No.: 4,666,028
Issued: May 19, 1987
Appl. No.: 797,470
Filed: Nov. 13, 1985

[51] Int. Cl.[4] ..... B66B 23/24

[52] U.S. Cl. ..... 198/335; 52/465; 52/718.1

[58] Field of Search ..... 198/335, 337; 256/68, 256/69; 403/312; 52/459, 465, 466, 467, 470, 716, 718

[56] References Cited

U.S. PATENT DOCUMENTS

| | | | |
|---|---|---|---|
| 1,806,687 | 5/1931 | Hoover | 403/312 |
| 3,321,059 | 5/1967 | Kroepel | 198/335 |
| 3,653,484 | 4/1972 | Taylor | 198/335 |
| 3,989,133 | 11/1976 | Courson et al. | 198/335 |

FOREIGN PATENT DOCUMENTS

| | | | |
|---|---|---|---|
| 1512084 | 2/1967 | France | 198/335 |
| 51-108482 | 9/1976 | Japan . | |
| 2104471 | 3/1983 | United Kingdom | 198/335 |

*Primary Examiner*—Robert J. Spar
*Assistant Examiner*—Cheryl L. Gastineau
*Attorney, Agent, or Firm*—Fay, Sharpe, Beall, Fagan, Minnich & McKee

[57] ABSTRACT

The balustrade comprises glass panels arranged on opposite sides of the passenger conveyor steps circulating endlessly, guide frames each of which has a U-shaped recess and is mounted on and bonded to the upper edge portion of the glass panel by adhesive, with the upper edge portion being inserted in the U-shaped recess so that both ends of the glass panel project from the ends of the guide frame, joint frames each of which has the same cross-section as the guide frame and is disposed in a gap formed between the adjacent guides by arranging the glass panel with the guide frame in an end-to-end relation, coupling plates disposed on both sides of the guide frames and joint frame to sandwich them and means for fastening the coupling plates. The guide frames and the joint frame, which support handrails circulating endlessly, are firmly and easily secured to the glass panels with simple construction.

17 Claims, 4 Drawing Sheets

BALUSTRADE OF PASSENGER CONVEYOR

Matter enclosed in heavy brackets [ ] appears in the original patent but forms no part of this reissue specification; matter printed in italics indicates the additions made by reissue.

BACKGROUND OF THE INVENTION

This invention relates to a balustrade of a passenger conveyor such as an escalator, a moving sidewalk, and so on, and more particularly to a balustrade of a passenger conveyor, which balustrade has a simplified construction.

A passenger conveyor has held an important position as indispensable transportation equipment inside a building and its use has been widespread up to this date. However, extremely diversified needs exist at present for the passenger conveyor, such as reduced power consumption, improved safety, a design having a side transparent portion, and so forth.

The construction of a typical passenger conveyor comprises a main body frame supported by the floor of a building, balustrades supported by the main body frame, handrails, and steps arranged and circulated endlessly in synchronism with the handrails.

One of conventional balustrades comprises glass panels supported by the main body frame, a handrail frame unit supported by the glass panel through the packing for protecting the glass panel, and a guide secured to the handrail frame unit to guide the handrails. The handrail frame unit holds illumination appliances at the outside of the glass panel so that the handrail frame unit is much wider in width than the handrail and projects a little both into the inside, that is, the passenger side and into the outside beyond the side faces of the handrail, about 10 mm and 50 mm, respectively.

This conventional passenger conveyor balustrade has several problems to be solved with respect to safty and design.

From the aspect of safety, it may happen that children can not completely grip the handrail. Namely, the height of the handrail from the steps is set to be from 650 to 750 mm to prevent the fall of passengers, and this height is suitable for the passengers above the school age. In the case of the children, however, a part of the hand comes into contact with the corner projecting inside the handrail frame as a problem besides the problem of height, and they can not easily grip the handrail. If a child attempts to grip the handrail under such an unstable state, the child's legs approach the skirt guard and will sometimes be caught around the steps. This is extremely dangerous.

From the aspect of design, there is the problem that the powder produced by abrasion of the handrail is piled on the handrail frame. This powder is a mixture of the powder produced by the abrasion. lost is due to friction of iron and rubber materials used for the driving system of the handrail and a material of the canvas portion. The feel of dirtiness and possible pollution of the clothes of passengers by this powder can not be neglected in the handrail equipment as public transportation facilities.

Further, demands are increasing recently for the balustrade having a wide transparency design and reduced power consumption without the illumination appliances.

When the illumination appliances are to be removed, it is a customary practice to cover the inside of the handrail frame with closing plate but not to change the members for the handrail frame. In the passenger conveyor without the illumination applicances, the intensity of illumination of the ceiling illumination is generally increased to insure sufficient service for passengers in order particularly to make the step portion sufficiently bright. From the aspect of lighting, however, the dimensions and construction of the conventional balustrade are extremely disadvantageous.

When the brightness of the ceiling illumination is to be introduced to the steps through the glass panel, the projecting dimension and the height of the handrail frame restrict the angle of the incidence of the rays of light. This state is particularly serious when the surroundings of the passenger conveyor are covered with a screen or the like, and the intensity of illumination indispensable for the safty of passengers can not be secured from time to time.

U.S. Pat. No. 3,989,133 and Japanese Laid-open Publication No. 108482/1976 can be cited as example of prior art. In these prior art, in which a guide frame with a U-shaped recess is mounted on the upper edge portion of a glass panel through a flexible groove-shaped member, some of the above-mentioned problems are solved, but some are still left unsolved. For example, a lower half of the guide frame is exposed outside from the handrail, so that the exposed guide frame shortens the transparent portion of the glass panel. It is necessary that the groove-shaped member should always apply a relatively large force to the guide member and the glass panel. Even a little deformation of leg portions of the guide member loosens the fastening of the guide frame and the glass panel, therefore, the leg portions need be thick. The groove-shaped member is necessary to keep such a force for a long time without being weakened.

U.S. patent application, Ser. No. 406,787 filed on Aug. 10, 1983, also discloses a balustrade improved on safety and design as above-mentioned. The balustrade comprises a glass panel and a guide frame mounted on the glass panel for guiding the handrail through a guide member. The guide frame has a guide member support portion and leg portions defining a recess for receiving the upper portion of the glass panel. The glass panel is inserted in the recess of the guide frame through a packing and the glass panel and the guide frame are fastened by a plurality of through-bolts. Therefore, the glass panel and packing have many notch portions for allowing the bolts to pass therethrough, and the guide member has a plurality of through-holes at the leg portions.

This balustrade involves the following problems yet to be solved. Namely, unexpected external force acts upon the handrail upper side portion to separate the glass panel from the guide frame. Therefore, a large number of screws must be used to cope with this external force. This force is caused by unintentional movement of passengers. Use of such a larger number of screws will increase the assembly cost and labor necessary for maintenance and inspection. Other external force is caused by inversion of the direction of the handrail and acts on the screw portions where the handrail inverts. This force further increases the number of screws. The notch portions of the glass panel are likely to come into contact with the metal screws, and the glass panel may be broken eventually.

SUMMARY OF THE INVENTION

An object of the present invention is to provide a balustrade of a passenger conveyor in which a guide frame for guiding a handrail can be fixed firmly and easily to a transparent panel with a simplified construction.

According to the present invention, a balustrade of a passenger conveyor is characterized in that a guide frame for guiding a handrail is thin in thickness and has a U-shaped recess mounted on and bonded to the upper edge portion of a glass panel thereby to provide a glass panel assembly in which both ends of the glass panel project outside from the guide frame; and a plurality of such glass panel assemblies are arranged in an end-to-end relation to form a gap between the adjacent guide frames, and are joined one to another through joint frames which are disposed in the gap to be mounted on the projected ends of the glass panels.

DESCRIPTION OF THE PREFERRED EMBODIMENT

An embodiment of the present invention is described hereunder referring to FIGS. 1 to 9.

Figure 1:
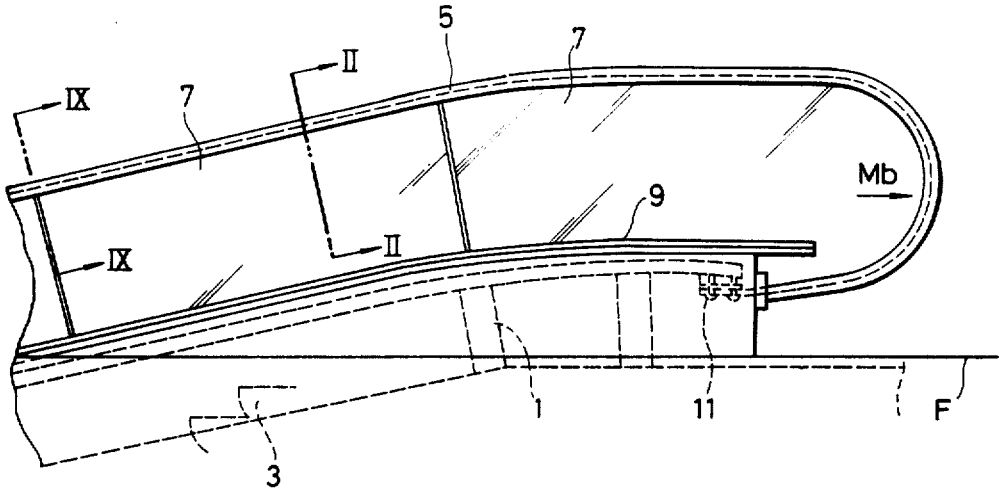
FIG. 1 is a side view of a part of a passenger conveyor according to the present invention.

In FIG. 1, a passenger conveyor is supported on the floor F by its main body frame 1. Steps 3 (only two are illustrated) are arranged in the main body frame 1 to circulate endlessly. A pair of balustrades are disposed above the main body frame 1 for guiding the upper run of handrails 5 circulating in synchronism with the steps 3. Each of the balustrates includes lower balustrade members of inner and outer decks and skirts, a plurality of glass panels 7 aligned in an end-to-end relation and rising from the decks 9, and guide means secured to the upper portion of the glass panel 7 for guiding the handrails 5.

Figure 2:
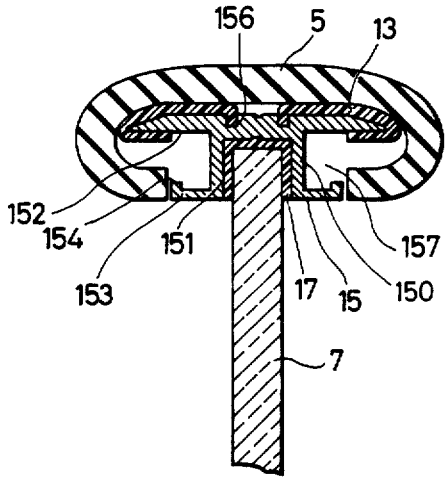
FIG. 2 is a sectional view, taken along a line II—II of FIG. 1, showing a section of a balustrade and handrail.

The guide means, as shown in FIG. 2, is constructed of guide members 13 of nylon, a guide frame 15 holding the guide members 13 and secured to the glass panel 7 with adhesive 17, and a coupling means (later described).

The guide frame 15 is elongated axially and has a guide member support portion 152 extending horizontally, a pair of leg portions 150 for defining a U-shaped recess 151 for receiving the upper edge portion of a glass panel 7, a pair of horizontal projections 153, projecting outside and inside, respectively, from the leg portions 150 and forming rectangular spaces 157 at both sides of the recess 151. Each of the projections has a small projection 154 so that the leg portion is more rigid and provides a wide face facing the handrail 5. The guide frame 15 is further provided with a pair of grooves 156 for fitting guide members 13. First, one end of the guide member is fitted over the support portion 152 and then the other end of the guide member 13 is fitted in the groove 156. Thereafter the guide member is secured by several screws (not shown) in a conventional manner.

Figure 3:
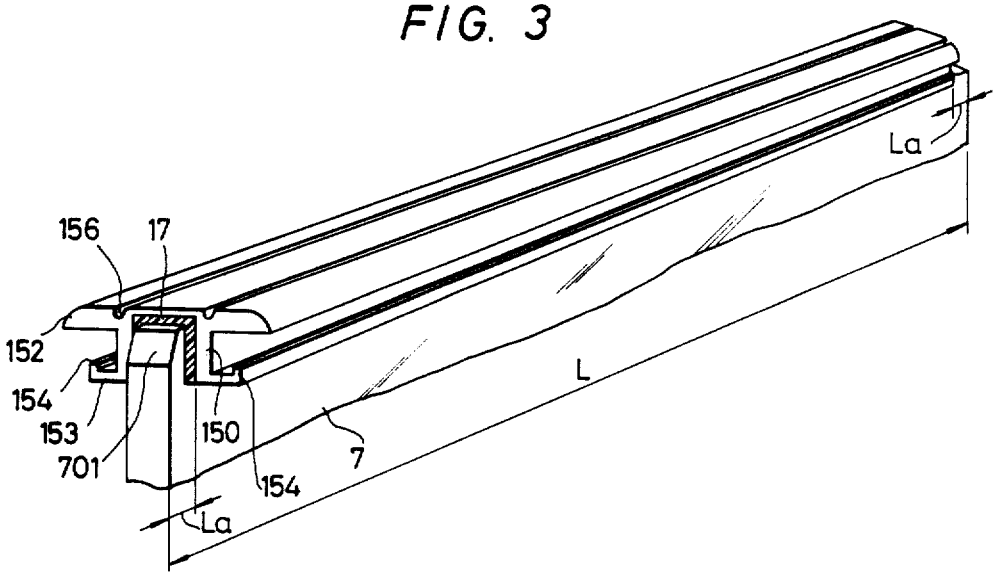
FIG. 3 is a perspective view of a glass panel having a guide frame bonded by adhesive.

A typical example of length L of the glass panel 7 is about 1.5–2 m, and the length of the guide frame 15 is 2 La (see FIG. 3) shorter than the glass panel length L, so that when the glass panel 7 is inserted in the U-shaped recess of the guide frame 15, both ends of the top edge of the glass panel 7 are left uncovered by an amount La as shown in FIG. 3. Two upper end corners of the glass panel 7 are cut off to form inclined surface portions 701. The length La is about 10–30 mm.

The guide frame 15 is bonded to the upper edge portion of the glass panel 7 with adhesive 17. As adhesive 17, a silicone type or urethane type adhesive is used, and the former is preferable, which has properties of sufficient bonding force and proper resiliency. For example, a silicon type adhesive (Sealant 70, trade name of adhesive made by Shinetsu Industrial Chemical Co. in Japan) has bonding force of about 30–60 kg for a guide frame of 30 mm length bonded to the glass panel. The joining work is carried out in such a fashion that a suitable quantity of adhesive 17 is first put into the U-shaped recess 151 and the upper end of the glass panel 7, that has been degreased sufficiently, is then located to keep the same gaps relative to the frame at both sides of the glass panel 7 and gradually inserted into the recess 151 to finally attain the state shown in FIG. 2. Preferably, the gap between the glass panel 7 and the guide frame 15 is about 2 mm around the upper edge portion of the glass panel having a thickness of about 10 mm.

Figure 4:
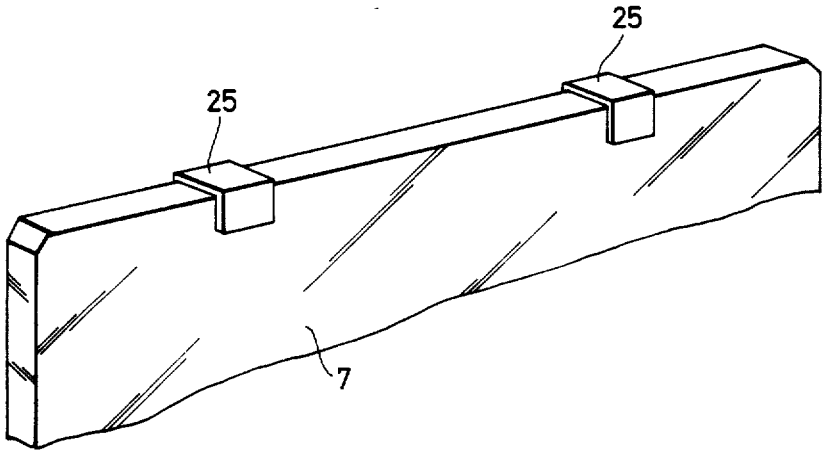
FIG. 4 is a perspective view of the glass panel having spacers mounted thereon.
Figure 5:
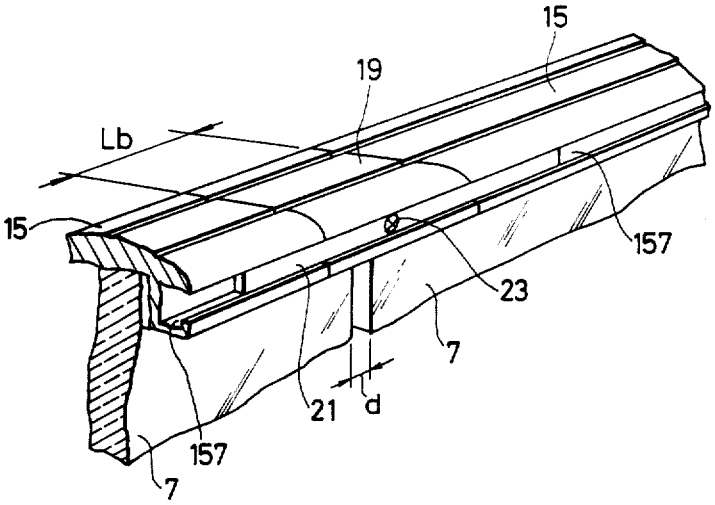
FIG. 5 is a perspective view of a joint portion of the balustrade.

To form a substantially uniform layer of adhesive between the glass panel 7 and the guide frame 15 in the U-shaped recess 151, it is preferable to use spacer 25 as shown in FIG. 4. The spacers 25 have a thickness of about 2 mm and length of about 10 mm, and they are disposed on the upper edge portion of the glass panel 7 with intervals before joining. A typical example of the application of the spacers 25 is such that each of two spacers is disposed at a portion spaced about 100 mm from the axial end of the glass panel 7, and another spacer, preferably, is disposed between the two spacers 25. The glass panel 7 with the spacers 25 is inserted in the U-shaped recess 151 of the guide frame 15 after the recess is filled with the adhesive 17, so that the adhesive layer is made uniform around the edge portion of the glass panel 7.

Figure 6:
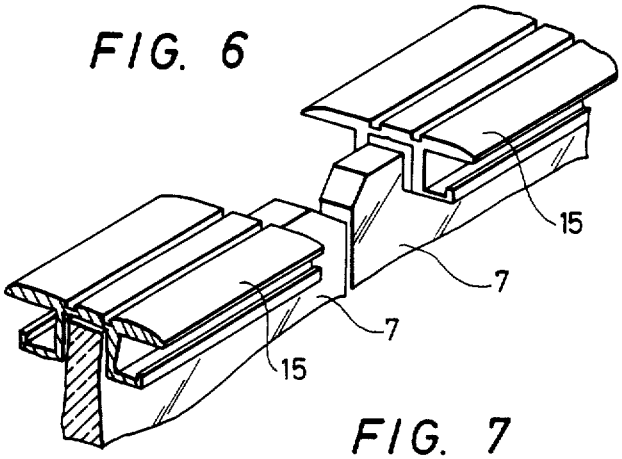
FIG. 6 is a perspective view of a joining portion of the glass panels with guide frame.
Figure 7:
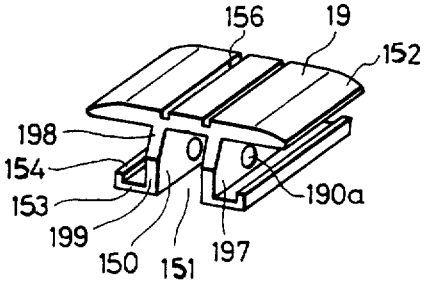
FIG. 7 is a perspective view of a joint frame.
Figure 8:
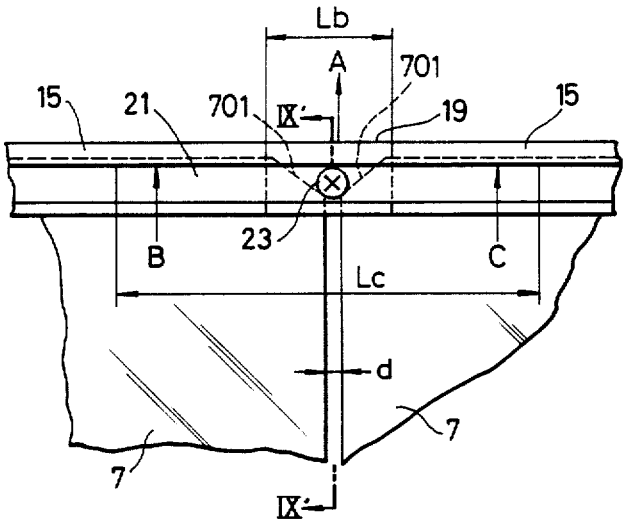
FIG. 8 is a side view of the FIG. 5.
Figure 9:
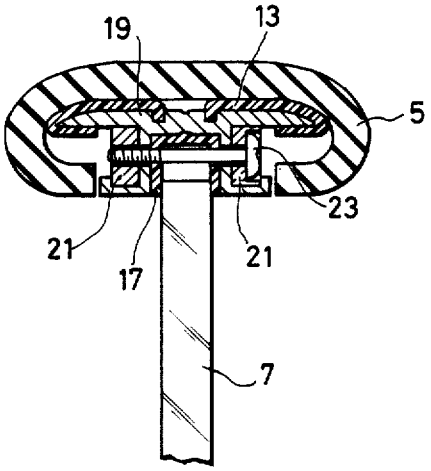
FIG. 9 is a sectional view of the balustrade taken along a line IX—IX of FIG. 1 or a line IX'—IX' of FIG. 8.

Each glass panel 7 and each guide frame 15 that are joined together as shown in FIG. 3 form a pair, that is, a glass panel assembly which is a glass panel with guide frame, and a plurality of pairs are disposed in the longitudinal direction of the passenger conveyor and at a predetermined position. The joint portion is shown in FIGS. 5 to 9, and coupling means for coupling two glass panel assemblies is constituted of a joint frame 19, coupling plates 21 and fastening means such as a screw 23 or a cotter pin. As shown in FIG. 6, the glass panels 7 are disposed in an end-to-end relation with a gap d of 2 to 4 mm between the glass panels 7 so that the inclined surface portions 701 form a space large enough to allow the screw 23 to pass therethrough, and gap Lb, between guide frames 15, which is twice La in FIG. 3 plus the gap d and and is about 20–60 mm. The joint frame 19 has exactly the same cross-sectional shape as of the guide frame 15, a length equal to gap Lb, and through hole 190a for the screw 23. Each of the pairs of the glass panels with the guide frames has a different gap (La) from one another, for example, by errors in manufacturing the glass panel and the guide frame, arrangement of the glass panels, etc.. For this reason, the length of the joint frame 19 is adjusted by reducing the end of the joint frame 19. In order to make it easy to reduce the end, the joint frame 19 has inclined end portion 198, which is made by reducing the corner, and perpendicular end portion 199 which is perpendicular to the longitudinal direction of the joint frame 19, at both ends. The perpendicular end portion 199 is reduced to adjust the length of the joint frame 19, and is fitted to the end of the guide frame 15 without forming any substantial gap therebetween, at the lower face of the projection of the guide frame. The joint frame 19 also is filled with adhesive and mounted on the end portions of the glass panels 7. Preferably, short spacers similar to the spacer 25 are mounted on the end portions of the glass panels, and the joint frame 19 may be inserted in gap Lb between the guide frames 15. The pair of coupling plates 21 have substantially the same cross-section as the rectangular spaces 157 of the guide frames 15 and the similar spaces of the joint frame 19. The length Lc (FIG. 8) of each of the coupling plates 21 is longer than Lb and 50–100 mm. One of the coupling plates 21 has a through-hole hole for the screw 23 and the other a threaded hole. The coupling plates 21 are inserted in the rectangular space 157 to sandwich the guide frames 15 and the joint frame 19, and are fastened by the screw 23, as shown in FIGS. 8 and 9, thereby firmly to fix the joint frame 19 and the guide frames 15 to the glass panels 7.

A packing or the adhesive is packed into the cavity or gap formed in the joint frame 19 and between the joint frame 19 and the guide frame 15 to close the same. According to this joint structure, even when push-up force concentratedly occurs on the joint frame 19 as represented by an arrow A in FIG. 8, the force is dispersed towards the guide frames 15 as represented by arrows B and C because the coupling plates are fitted in the recess 157 of the guide frames and recess 197 of the joint frame, respectively. Accordingly, the joint frame 19 does not easily come off, and the reliability of the joint of the glass panel 7 to the guide frame at the joint portion can be increased drastically.

On the other hand, a specific contrivance is applied to the handrail lower side members, too, in the present invention.

At the end portion of the handrail equipment or balustrade at which the greatest peel force acts upon the glass panel 7 and the guide frame 15 fixed to each other by the adhesive as shown in FIG. 1, the end of the guide frame 15 is fixed to a part of the main body frame 1 by the screw 11 in order to withstand the force which is represented by an arrow Mb.

The construction described above has the following effects: The assembly and maintenance and inspection can be extremely simplified because the guide frame and the glass panel are treated as a unit and many screws and notches are not used. The reliability of the joint portion is improved with respect to safety and strength. The glass panel is protected by the adhesive, and the vibration resulting from the travel of the handrail can be damped. This means also that any impact from passengers can be mitigated. The construction of the balustrade can sufficiently cope with the external force resulting from the inversion of the handrail.

The balustrade has a design having a wide transparent portion and high safety.

What is claimed is:

1. A passenger conveyor, comprising:

a main body frame;

a plurality of steps supported by said main body frame, connected together and mounted on said frame to circulate endlessly;

a pair of handrails driven in synchronism with said steps and in the same direction as said steps;

transparent panels supported by said main frame and disposed on opposite sides of said steps to form side walls;

guide means for said handrail being provided on the upper portions of said panels, including a guide frame having a guide member support portion and leg portions, said leg portions defining therebetween a U-shaped recess;

adhesive means mounting said guide frame on the upper edge portion of said transparent panel to provide a panel assembly in which both ends of said panel axially project beyond the guide frame that is mounted on the panel;

a plurality of said panel assemblies being mounted on said body frame in an end-to-end relation thereby to form an axial gap between adjacent guide frames; and coupling means, for coupling adjacent ones of said panel assemblies, said coupling means including a joint frame disposed in said gap.

2. A passenger conveyor according to claim 1, wherein each of said guide frames is shorter in length, as measured in the conveying direction, than the panel on which it is mounted.

3. The passenger conveyor according to claim 2, wherein said joint frames have the same cross-sectional shape as said guide frames.

4. The passenger conveyor according to claim 3, wherein the leg portions of said joint frame have aligned apertures, and said coupling means further includes a threaded fastener passing through said aligned apertures for clamping the leg portions of the joint frame together.

5. The conveyor as defined in claim 4, wherein each of said panels has inclined surface portions formed at both upper corner portions, said fastening means is passed through a space defined by adjacent ones of said inclined surface portions of adjacent ones of said glass panels disposed in an end-to-end relation.

6. The conveyor as defined in claim 5, wherein said guide frame has projections extending from the terminal end of said leg portions respectively to engage the handrail; said coupling means having coupling members overlapping each of said joint frames and the adjacent guide frames; said fastener means passing through said coupling members; said projections, said guide member support portions and said leg portions form spaces on both sides of said leg portions for receiving said coupling members.

7. The conveyor as defined in claim 6, wherein spacers are disposed between said guide frame and said glass panel in said U-shaped recess of said guide frame to provide a uniform gap between each panel and the interior surfaces of the U-shaped recess for keeping said adhesive means substantially uniform.

8. The conveyor as defined in claim 7, wherein said joint frame has inclined durface end portions and perpendicular end portions, and said perpendicular end portions are in contact with respective ends of adjacent ones of said guide frame to facilitate shortening of said joint frame by removing portions of said perpendicular end portion to obtain a close fit of said joint frame between adjacent guide frames.

9. The conveyor as defined in claim 4, wherein at least one of the two terminal panels of the end-to-end relation of panels has a curved side wall remote from the other panels, the curved side wall extending from the upper portion of the panel to the lower portion of the panel, the guide frame of said one panel extending over the curved side wall and having a terminal end fixed to said main body frame.

10. The conveyor as defined in claim 4, wherein said adhesive is of a silicone type.

11. The conveyor as defined in claim 4, wherein said threaded fastener is a screw.

12. The conveyor as defined in claim 4, wherein said guide frame has a small projection at the outside end of said leg portions, respectively, said small projection faces the handrail with a gap.

13. The conveyor as defined in claim 4, wherein each of said panels has recess portions formed at both upper corner portions, whereby adjacent panels together form an aperture aligned with said apertures in said leg portions for passing therethrough said fastener means.

14. The conveyor as defined in claim 13, wherein said upper edge portions of each panel are continuous and uninterrupted from one corner portion to the other corner portion with the exception of said corner portion recesses, said adhesive means forming the only connection between said guide frames and said panels.

15. The conveyor as defined in claim 14, wherein said guide frame has projections extending from the terminal end of said leg portions respectively to engage the handrail; said coupling means having coupling members overlapping each of said joint frames and the adjacent guide frames; said fastener means passing through said coupling members; said projections, said guide member support portions and said leg portions form recesses defining spaces on both sides of said leg portions for receiving said coupling members.

16. The conveyor as defined in claim 15, said coupling members being rigid plates cooperating with said recesses so that an upward force on any one of the joint frame and adjacent portions of the guide frames will be transmitted through respective recesses and coupling plates to the other frames.

17. The conveyor as defined in claim 1, wherein spacers are disposed between said guide frame and said glass panel in said U-shaped recess of said guide frame to provide a uniform gap between each panel and the interior surfaces of the U-shaped recess for keeping said adhesive means substantially uniform.

* * * * *

UNITED STATES PATENT AND TRADEMARK OFFICE

CERTIFICATE OF CORRECTION

PATENT NO. : Re. 32,839

DATED : Jan. 24, 1989

INVENTOR(S) : Cyuichi Saito et al

It is certified that error appears in the above-identified patent and that said Letters Patent is hereby corrected as shown below:

Page 1, first column, after line 6, insert

--[30] Foreign Application Priority Data

Nov. 21, 1984 [JP] Japan.....59-244468--

Signed and Sealed this

Twenty-seventh Day of June, 1989

*Attest:*

DONALD J. QUIGG

*Attesting Officer*

*Commissioner of Patents and Trademarks*